Feb. 1, 1949. R. F. HERTEL 2,460,750
DYNAMOELECTRIC MACHINE
Filed Oct. 18, 1946

Inventor:
Roland F. Hertel,
by Browell S. Mack
His Attorney.

Patented Feb. 1, 1949

2,460,750

UNITED STATES PATENT OFFICE 2,460,750

DYNAMOELECTRIC MACHINE

Roland F. Hertel, Nutley, N. J., assignor to General Electric Company, a corporation of New York Application October 18, 1946, Serial No. 704,248

9 Claims. (Cl. 188—104)

1

My invention relates to dynamoelectric machines and particularly to the inductor eddy current type adapted to be used as a dynamometer, brake, or clutch.

An object of my invention is to provide an improved inductor eddy current type dynamoelectric machine.

Another object of my invention is to provide an improved inductor eddy current type dynamoelectric machine for use as a dynamometer, brake, or clutch, in which a cooling fluid is supplied directly into contact with the inductor surface of the rotor member of the machine.

A further object of my invention is to provide an improved inductor eddy current type dynamoelectric machine provided with a cooling arrangement in which cooling fluid is supplied into direct contact with the inductor surface of the machine and in which a relatively high velocity jet of fluid is directed against the direction of rotation of the rotor for removal of the cooling fluid from the inductor surface.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
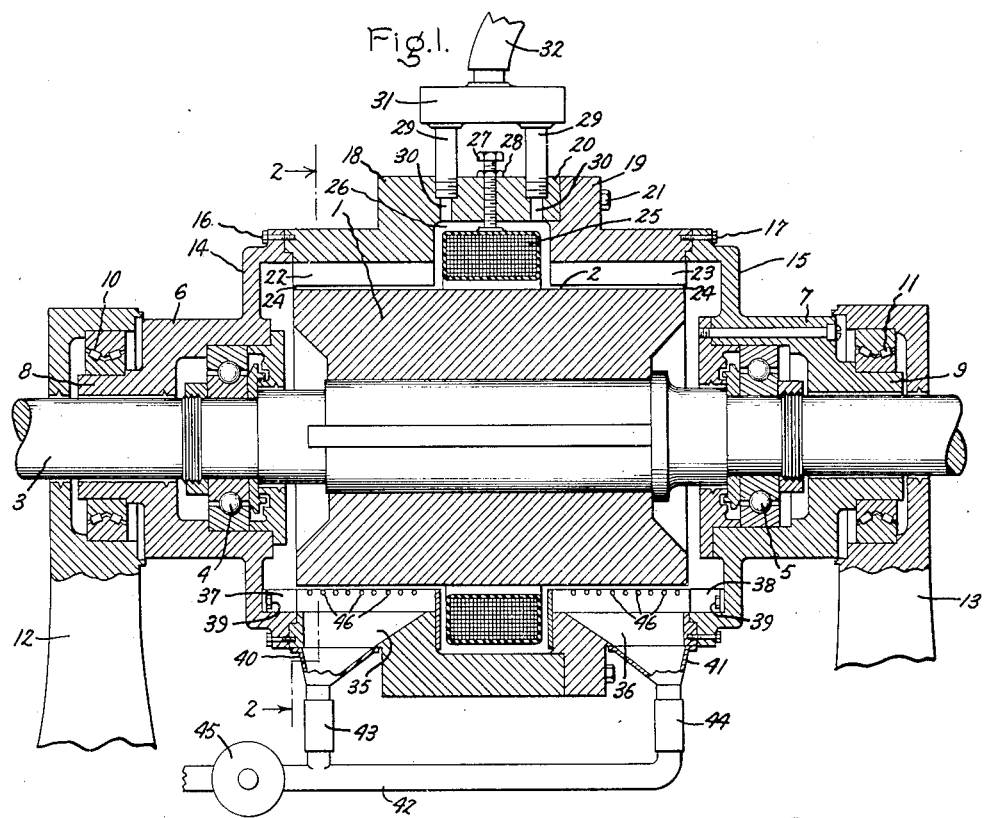
Figure 2:
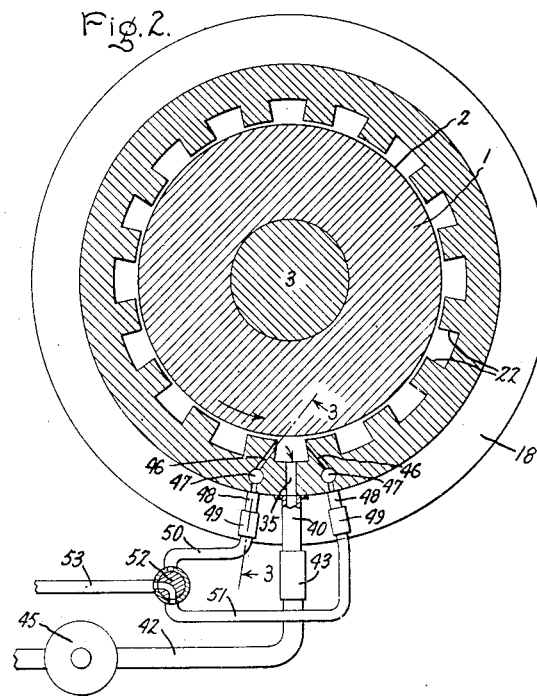
Figure 3:
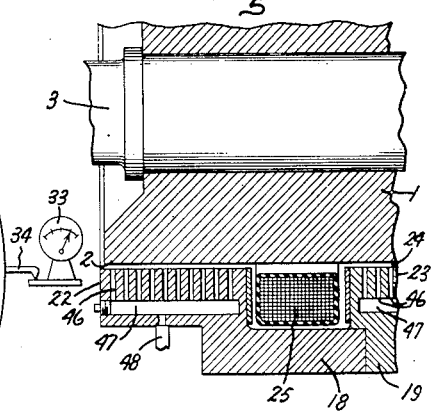

In the drawing, Fig. 1 is a side elevational view, partly in section and partly broken away, illustrating an embodiment of my invention applied to an inductor eddy current type dynamoelectric machine adapted to be used as a dynamometer, brake, or clutch; Fig. 2 is a sectional view taken along line 2—2 of Fig. 1; and Fig. 3 is a sectional fragmentary view taken along line 3—3 of Fig. 2.

Referring to the drawing, I have shown an embodiment of my invention applied to an inductor eddy current type dynamoelectric machine adapted to be used as a dynamometer or brake and in which the machine is provided with a rotor having a core 1 of magnetic material with a relatively smooth inductor eddy current surface 2 on the outer cylindrical peripheral surface thereof and supported in any suitable manner with a driving engagement on a shaft 3 which is rotatably mounted by bearings 4 and 5 in a relatively stationary member of the machine. This relatively stationary member is formed with bearing housings 6 and 7 at each end thereof for supporting the rotor bearings 4 and 5 and is also formed with axially extending hubs 8 and 9, respectively, which are adapted to be supported by suitable thrust antifriction bearings 10 and 11 mounted in pedestals 12 and 13 which support the weight of the machine. The bearing housings 6 and 7 form a part of end shields 14 and 15 which are secured by any suitable means, such as bolts 16 and 17 to a core of magnetic material for the stationary member which is shown as formed of two parts 18 and 19 suitably secured together by a good rabbet fit at 20 and by a plurality of circumferentially spaced bolts 21. This stationary member core is formed with magnetic flux-concentrating polar tooth means which are arranged as teeth 22 and 23 on the stationary member core elements 18 and 19 and extend substantially axially of the machine from adjacent the center thereof to the ends of the machine, with inner tooth faces adjacent the rotor inductor surface and radially spaced therefrom by a relatively small air gap 24.

Magnetic excitation is adapted to be provided to the machine and to link the rotor inductor surface 2 and the stationary member flux-concentrating teeth 22 and 23 and pass through the stationary member core elements 18 and 19 for producing eddy currents in the rotor inductor surface 2 on rotation of the rotor 1. This magnetic excitation is provided to the machine by a substantially toroidal field exciting winding 25 arranged in a suitable winding recess 26 formed in the stationary member intermediate the ends thereof and between the flux-concentrating polar tooth means 22 and 23 and is mounted in spaced relation relative to the winding recess sides 26 and the base of this winding recess to provide for the circulation of cooling liquid around the winding 25 for suitably removing the heat generated therein by the excitation current when this winding is energized. This spaced support of the winding 25 may be provided in any suitable manner, as by a plurality of mounting clamp bolts 27 circumferentially spaced around the periphery of the toroidal field winding 25 and extending through the stationary member and locked in position in any suitable manner, as by a lock nut 28.

In order further to cool the machine and to provide for an increased absorptive capacity to the equipment, a cooling fluid supply, including a pair of supply connecting pipes 29, extends into cooling fluid supply openings 30 formed in the stationary member and connects the winding recess 26 with a cooling liquid supply header 31. This header 31 is adapted to be connected to a cooling fluid supply in any suitable manner by a flexible connector, such as a rubber hose 32, which will minimize resistance to a slight turning or rotation of the stationary member relative to the source of cooling fluid supply. This minimizes the effect of this connection upon an instrument, such as a weighing scale 33, which is adapted to read the torque transmitted by the stationary member through a suitable torque-transmitting arm 34 as schematically illustrated in Fig. 2, when this equipment is used as a dynamometer. With this construction, cooling fluid, such as water or other liquid, flows from the supply openings 30 into the winding recess 26 and around the winding 25 to cool the same and out into the air gap 24 between the flux-concentrating teeth 22 and 23 and into the air gap between the faces of these teeth and the rotatable inductor surface 2 of the rotor into direct contact with this inductor surface for removing the heat generated therein by the eddy currents induced in this surface on rotation of the rotor when the machine is magnetically excited. This cooling fluid is adapted to flow through the air gap and over the inductor eddy current surface towards both ends of the machine into the spaces in the end shields 14 and 15 and will generally gravitate towards the lower portion of these spaces in the end shields. It has been found, however, that in machines of this type, the cooling fluid which collects in the ends of the machine tends to continue to rotate in the spaces in the end shields and may cause a considerable hydraulic drag on the machine which may become undesirably large. In order to minimize this effect, the machine is provided with suitable cooling fluid exhaust openings in the lower portion thereof, such as are shown at 35 and 36 in the stationary member elements 18 and 19. These cooling fluid exhaust openings are formed preferably in the slot spaces between the flux-concentrating teeth 22 and 23 and communicate through these slots with the space in the end shields 14 and 15. In order further to minimize the circulation of the cooling fluid which collects in the end shield, baffles 37 and 38 preferably are arranged in the lower part of the end shields 14 and 15, respectively, and are secured therein in any suitable manner, as by bolts 39, substantially in the central part of the slots into which the cooling fluid exhaust openings 35 and 36 extend. These baffles 37 and 38 also act to direct cooling fluid inwardly into the cooling fluid exhaust openings 35 and 36, from which it may be drained from the machine through suitable drain connections 40 and 41. In the arrangement shown in Figs. 1 and 2, the drain connections 40 and 41 are connected to a main cooling fluid drain pipe 42 through suitable flexible hose connections 43 and 44 to minimize the torque absorption by these connections on the stationary member of the machine. The main drain pipe 42 is connected to a sump pump 45 which further acts to withdraw cooling liquid from the machine through the drain connected thereto.

It has been found that in this type construction, a layer of cooling fluid, such as water, tends to cling to the peripheral eddy current inductor surface of the rotor and is not removed therefrom as rapidly as might be desired under certain load conditions, thereby preventing the maximum utilization of the cooling effect of the passage of the cooling fluid directly in contact with this inductor surface. In order to increase the efficiency of this cooling system, I provide means for removing this clinging film of cooling fluid from the inductor surface of the rotor by the application of a relatively high velocity jet of fluid directed against the rotor inductor eddy current surrface in a direction substantially opposite to the direction of rotation of the rotor. Such a high velocity jet of fluid which may comprise any suitable medium, such as air or water, may be supplied into the air gap of the machine and against the inductor surface of the rotor through a plurality of jet openings 46 extending substantially tangentially towards the inductor surface of the rotor through openings in one of the flux-concentrating polar teeth 22 and 23 on each side of the exciting winding 25. These jet openings are connected to headers 47 to which a supply of the fluid used for the jet is connected by any suitable means, such as a supply tube 48 connected through a flexible connection 49 to supply pipes 50 and 51 which communicate with a selective supply valve 52. The flexible hose connections 49 minimize the effect of the jet fluid supply connection upon the transmission of torque from the stationary member to the torque-indicating scale 33 by minimizing the restraint imposed on the stationary member by these connections. The selective valve 52 is adapted to connect either the supply 50 or the supply pipe 51 to the main source of jet fluid supply 53 in order to assure the injection of the high velocity jet into the air gap 24 of the machine against the direction of rotation of the rotor 1 by providing for the selective supply of jet fluid to either of these two supply pipes which connect to jet openings 46 directed in opposite directions, as is more clearly shown in Fig. 2. These high velocity jets are adapted to inject fluid against the inductor surface 2 of the rotor 1 in such a manner as to scrape off the cooling liquid film from the inductor surface 2 and direct this film into the cooling fluid exhaust passages 35 and 36, as indicated by the arrows in Fig. 2. The detailed arrangement of the supply of this high velocity jet as shown in the drawing is for illustrative purposes only and the particular arrangement of the jet passages or nozzles may obviously be varied to provide the desired scraping effect on the film of cooling fluid which adheres to the inductor surface 2 of the rotor.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means for producing magnetic excitation of said machine for producing eddy currents in said rotor inductor surface on rotation of said rotor, means for supplying cooling liquid for flow into contact with said rotor inductor eddy current surface for cooling the same, at least one cooling liquid exhaust passage formed between said magnetic flux-concentrating polar means adjacent the lower part of said machine, and means for supplying a high velocity jet of air directed against said rotor inductor eddy current surface in a direction opposite to the direction of rotation of said rotor and adjacent said exhaust passage whereby the cooling liquid is removed from said rotor inductor eddy current surface for flow into said exhaust passage.

2. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means including a field exciting winding mounted in said machine for producing magnetic excitation adapted to link said rotor inductor surface and said stator magnetic flux-concentrating polar means for producing eddy currents in said rotor inductor surface on rotation of said rotor, means for supplying cooling fluid for flow into said air gap and into contact with said rotor inductor eddy current surface for cooling the same, at least one cooling fluid exhaust passage formed between said magnetic flux-concentrating polar means adjacent the lower part of said machine, and means for selectively supplying a high velocity jet of fluid directed against said rotor inductor eddy current surface in a direction opposite to the direction of rotation of said rotor for removal of cooling fluid from said rotor inductor eddy current surface for flow into said exhaust passage.

3. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means for inducing eddy currents in said rotor inductor surface on rotation of said rotor, means for supplying cooling fluid for flow into contact with said rotor inductor eddy current surface for cooling the same, at least one cooling fluid exhaust passage formed between said magnetic flux-concentrating polar means adjacent the lower part of said machine, and means for supplying a high velocity jet of fluid directed against said rotor inductor eddy current surface in a direction opposite to the direction of rotation of said rotor through openings in at least one of said flux-concentrating polar tooth means adjacent said exhaust passage whereby the cooling fluid is removed from said rotor inductor eddy current surface for flow into said exhaust passage.

4. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means including a field exciting winding mounted in said machine for producing magnetic excitation adapted to link said rotor inductor surface and said stator magnetic flux-concentrating polar means for producing eddy currents in said rotor inductor surface on rotation of said rotor, means for supplying cooling fluid for flow around said field exciting winding into said air gap and into contact with said rotor inductor eddy current surface for cooling the same, at least one cooling fluid exhaust passage, and means for selectively supplying a high velocity jet of fluid directed against said rotor inductor eddy current surface in opposite directions for maintaining the jet direction opposite to the direction of rotation of said rotor for removal of cooling fluid from said rotor inductor eddy current surface for flow into said exhaust passage.

5. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means including a field exciting winding mounted in said machine for producing magnetic excitation adapted to link said rotor inductor surface and said stator magnetic flux-concentrating polar means for producing eddy currents in said rotor inductor surface on rotation of said rotor, means for supplying cooling fluid for flow around said field exciting winding into said air gap and into contact with said rotor inductor eddy current surface for cooling the same, at least one cooling fluid exhaust passage formed between said magnetic flux-concentrating polar means adjacent the lower part of said machine, and means for supplying a high velocity jet of fluid directed against said rotor inductor eddy current surface in a direction opposite the direction of rotation of said rotor and adjacent said exhaust passage whereby the cooling fluid is removed from said rotor inductor eddy current surface for flow into said exhaust passage.

6. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means including a field exciting winding mounted in said machine for producing magnetic excitation adapted to link said rotor inductor surface and said stator magnetic flux-concentrating polar means for producing eddy currents in said rotor inductor surface on rotation of said rotor, means for supplying cooling fluid for flow into contact with said rotor inductor eddy current surface for cooling the same, at least one cooling fluid exhaust passage formed between said magnetic flux-concentrating polar means adjacent the lower part of said machine, means including directing vanes in each end of said machine for directing cooling fluid from said machine ends into said exhaust passage, and means for supplying a high velocity jet of fluid directed against said rotor inductor eddy current surface in a direction opposite to the direction of rotation of said rotor and adjacent said exhaust passage whereby the cooling fluid is removed from said rotor inductor eddy current surface for flow into said exhaust passage.

7. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means for producing magnetic excitation of said machine for producing eddy currents in said rotor inductor surface on rotation of said rotor, means for supplying cooling liquid for flow around said field exciting winding into said air gap and into contact with said rotor inductor eddy current surface for cooling the same, at least one cooling liquid exhaust passage formed between said magnetic flux-concentrating polar means adjacent the lower part of said machine, and means for selectively supplying a high velocity jet of liquid directed against said rotor inductor eddy current surface in opposite directions for maintaining the jet direction opposite to the direction of rotation of said rotor, said selective supply means including openings in said flux-concentrating polar tooth means on each side of said exhaust passage for removal of cooling liquid from said rotor inductor eddy current surface for flow into said exhaust passage.

8. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means including a field exciting winding mounted in said machine for producing magnetic excitation adapted to link said rotor inductor surface and said stator magnetic flux-concentrating polar means for producing eddy currents in said rotor inductor surface on rotation of said rotor, means for supplying cooling fluid for flow around said field exciting winding into said air gap and into contact with said rotor inductor eddy current surface for cooling the same, at least one cooling fluid exhaust passage formed between said magnetic flux-concentrating polar means adjacent the lower part of said machine, means including directing vanes in each end of said machine for directing cooling fluid from said machine ends into said exhaust passage, and means for supplying a high velocity jet of fluid directed against said rotor inductor eddy current surface in a direction opposite to the direction of rotation of said rotor and through openings in at least one of said flux-concentrating polar tooth means adjacent said exhaust passage whereby the cooling fluid is removed from said rotor inductor eddy current surface for flow into said exhaust passage.

9. An inductor eddy current type dynamoelectric machine having a rotor with a relatively smooth inductor eddy current surface and a relatively stationary member having magnetic flux-concentrating polar tooth means adjacent said rotor inductor surface radially spaced therefrom by an air gap, means including a field exciting winding mounted in said machine for producing magnetic excitation adapted to link said rotor inductor surface and said stator magnetic flux-concentrating polar means for producing eddy currents in said rotor inductor surface on rotation of said rotor, means for supplying cooling liquid for flow around said field exciting winding into said air gap and into contact with said rotor inductor eddy current surface for cooling the same, at least one cooling liquid exhaust passage formed between said magnetic flux-concentrating polar means adjacent the lower part of said machine, means including directing vanes in each end of said machine for directing cooling fluid from said machine ends into said exhaust passage, and means for selectively supplying a high velocity jet of liquid directed against said rotor inductor eddy current surface in opposite directions for maintaining the jet direction opposite to the direction of rotation of said rotor for removal of cooling liquid from said rotor inductor eddy current surface for flow into said exhaust passage.

ROLAND F. HERTEL.

REFERENCES CITED

The following references are of record in the file of this patent:

UNITED STATES PATENTS

| Number | Name | Date |
|---|---|---|
| 2,398,638 | Hertel | Apr. 16, 1946 |
| 2,407,504 | Martin | Sept. 10, 1946 |